Patented Mar. 21, 1950

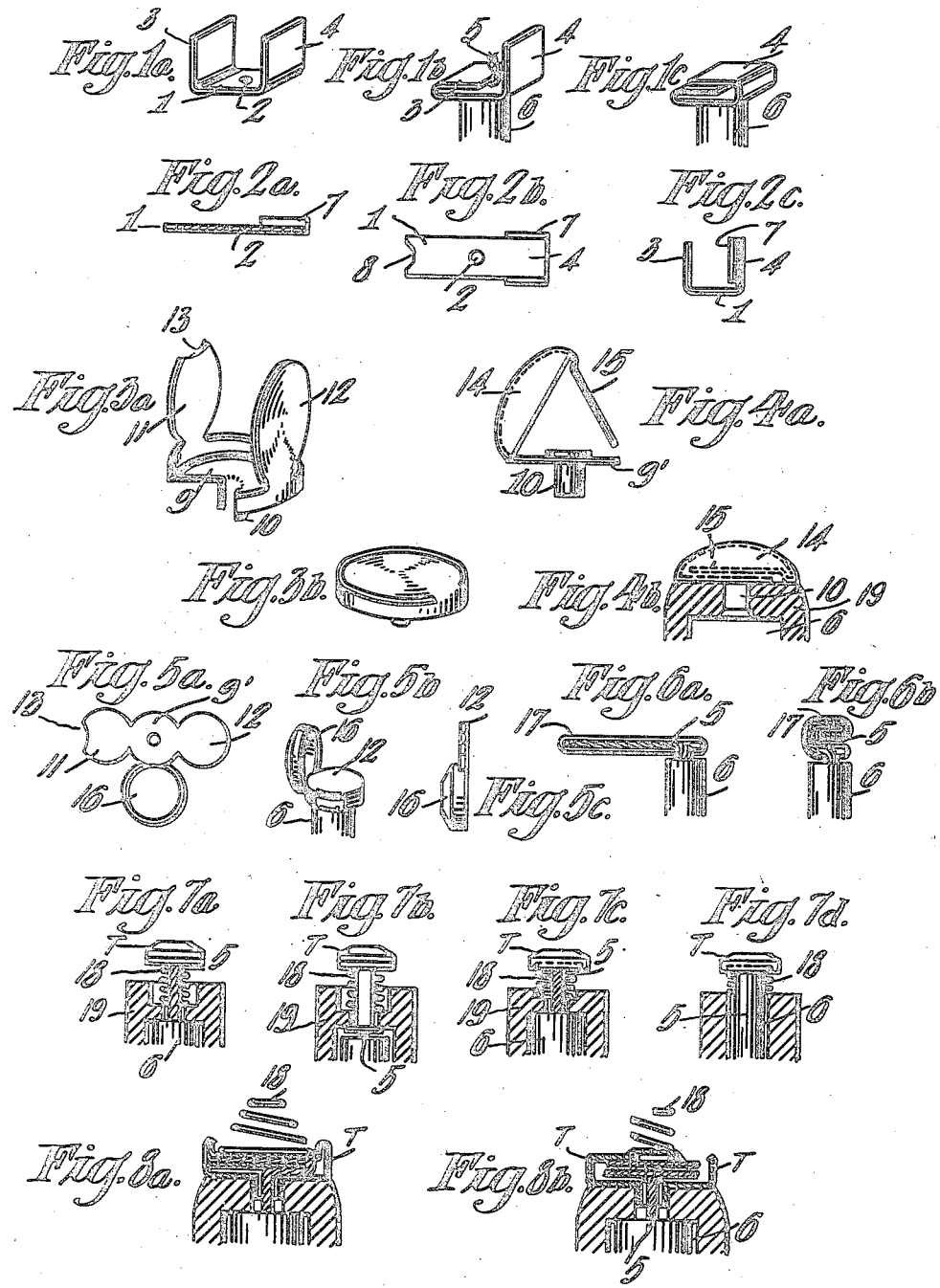

2,501,007

UNITED STATES PATENT OFFICE 2,501,007

CABLE TERMINATING DEVICE

James William Sanger-Stevens, Chelmsford, and Harold Joseph Hughes Wassell, Danbury, England, assignors, by mesne assignments, to Radio Corporation of America, New York, N. Y., a corporation of Delaware Application April 29, 1947, Serial No. 744,738
In Great Britain April 5, 1946

Section 1, Public Law 690, August 8, 1946
Patent expires April 5, 1966

5 Claims. (Cl. 173—269)

This invention relates to cable termination devices and has for its object to provide improved simplified cable termination devices which shall be suitable for use for terminating high voltage and/or high frequency insulating cables (for example, ignition cables), which shall be simple to make and easy to fit, which shall provide reliable mechanically permanent termination and which shall be of relatively smooth external shape—an advantage particularly in the case of high frequency and high voltage cables.

According to this invention, a cable termination device comprises a strip or pressing of ductile conductive material preferably having an aperture or guide for the entry of the bared end or core of the cable to be terminated and formed integrally with at least one flap adapted to be bent over upon and thus to grip the core or bared end of the cable, the device being adapted to be then subjected to a second folding, whereby the said core or bared end is constrained into and held gripped in a tortuous formation.

Preferably, a device in accordance with this invention has at least two flaps which are bent over in turn and so arranged that the core lies gripped between them in a zig-zag path.

The invention is illustrated in the accompanying drawings, which show a number of embodiments.

Referring to Figs. 1a, 1b and 1c, the cable terminating device therein shown consists (as shown in Fig. 1a) of a rectangular strip 1 of ductile conductive material (such as copper) having an approximately central hole 2 for the reception of the bared core of a cable, and formed with two flaps 3, 4, constituting parts of the length of the strip, when flat. The cable core 5 is pushed through the hole 2 in the strip leaving the insulation 6 of the cable abutting against one side thereof and one flap 3 is then bent down on to the core (as shown in Fig. 1b), pressing part of its length between said flap and the main body of the strip where the hole is. The second flap 4 is then bent down to grip the remainder of the core length between itself and the first flap (as shown in Fig. 1c). The core thus lies in a zig-zag path and is gripped between the different parts of the now bent-over strip.

In the modification shown in mutually perpendicular views in Figs. 2a, 2b and 2c, the strip is formed with side ears 7 near one end, and the edge at the other end is cut away in a U or V at 8, so that when the first flap is bent down the core (not shown) is located by said U or V against any possible sideways movement, while when the second flap is bent down the ears may be bent over to enclose the sides of the first flap. Obviously, if desired, there may be an end ear as well as side ears to complete the enclosure. In Figs. 2a and 2b the strip is shown flat, except that the ears are bent up, and in Fig. 2c the flaps are bent up but not folded down.

In a further modification illustrated in Fig. 3a and Fig. 3b, a terminating device consists of a saucer-like pressing 9 with a central collar 10 through which the core (not shown) is entered and two oppositely disposed roughly circular flaps 11, 12 upstanding from and integrally formed with the edge of the saucer. One of these flaps 11 has a U recess 13 cut in its upper end and the other flap 12 is preferably slightly domed (as shown in Fig. 3a). The core is pushed through the collar, the flap 11 is pressed down on it, leaving an end which is then bent back over this flap, and the domed flap 12 is then pressed down upon the first—so that the two flaps now lie one above the other in the top of the saucer, gripping the core between them and making a neat, firm circular termination (as shown in Fig. 3b). This embodiment may be varied by using an eyelet in place of the collar 10. A similar variation may be made in the embodiment of Figs. 1a, 1b and 1c; i. e., an eyelet may replace the simple aperture 2. In fact, in all embodiments of this invention, it is possible to use an eyelet for what may be termed the guiding lead-in of the core.

In a still further modification illustrated in Figs. 4a and 4b, the first flap 11 of Figs. 3a and 3b is replaced by a hollow domed member 14 integrally formed with the main body 9', which now is not saucer-shaped but flat or annular. This domed member 14 has integrally formed therewith (as shown in Fig. 4a) a disc-like flap 15 attached thereto on the side opposite that at which said domed member is itself attached to the main body. With this device the bared end of the wire is pushed up through an eyelet or the like in the center of the main body 9' so that its end comes into the corner of the domed member 14, near the circular flap 15. The flap is then pressed up into the dome and the dome itself then pressed down onto the main body (as shown in Fig. 4b, in which the termination device is shown fitted to a cable which is run into an insulating or other associated part 19).

In a still further modification shown in Figs. 5a, 5b and 5c, a terminating device resembles that of Figs. 3a and 3b and comprises a saucer-like member 9' with two flaps 11, 12, except that the member 9' is again left flat and a third flap 16 in the form of a cap is integrally formed therewith at right angles to the other two flaps. With this construction the two flaps 11, 12 are pressed down in turn and the cap 16 is then pressed over onto the said flaps to enclose them.

In a still further modification shown in Figs. 6a and 6b, a terminating device consists simply of a strip 17 of copper or the like which is bent over upon itself to form a flat U with one leg a little longer than the other. The core 5 is pushed in between the legs of the U from the open end thereof, and the said legs are pressed together so that the core is gripped between them. The longer limb of the U is bent over towards the end of the shorter limb, so as to complete the enclosure in one plane (as shown in Fig. 6a) and the sandwich now constituted by the legs of the U and the core is then rolled up and pressed down tight (as shown in Fig. 6b).

In all the embodiments above described, it has been assumed that the cable core is left in one piece and bent over as one piece. This, of course, is not necessary, for the core, if of suitable nature, may be parted and the different parts led round the different flaps, as desired, before pressing up.

The invention lends itself to the construction of spring terminals. For example, as shown in Figs. 7a to 7d, a spring effect can be obtained by threading a helical or similar spring 18 over the bared end or core 5 of the cable, before putting on and pressing up the terminating device, here generally designated T, so that the spring tends to force said terminating device away from the cable insulation 6 (Fig. 7d) or to force the said terminating device and with it the whole end of the cable away from a suitably formed auxiliary shoulder on an associated part 19 (Figs. 7a, 7b and 7c). In such cases the underside of the terminating device (i. e., that part which forms the underside when it is folded) may be recessed or grooved to receive the spring end (Figs. 7a, 7b and 7c). Again, if desired, the upper side of a terminating device (in accordance with this invention) may be formed as shown, for example, in Figs. 8a or 8b, to receive or locate a spring 18 to be mounted above said terminating device (i. e., on the side thereof remote from the cable) and, if desired, the said terminating device may be formed with a top flap or tongue designed to enter a coil of the spring and to be bent over to retain it (Fig. 8b).

What is claimed is:

1. A cable termination device comprising a circular shaped conductive metallic body portion having a central aperture therein through which the bared metallic core of a cable passes, a hollow domed member integrally formed with the circular conductive metallic body portion, a disc-like flap attached to the domed member at a side opposite that at which said domed member is attached to the body portion, said hollow domed member and said disc-like flap adapted to be bent down, in overlapping relation to each other to grip said core in a zig-zag formation.

2. A cable termination device, comprising a conductive metallic member having a main portion of substantially circular configuration, said member having a substantially central aperture therein for receiving therethrough the bared metallic core of a cable, said member having integral therewith two flap portions of substantially circular configuration, said flap portion being bent down oppositely with respect to the length of said core, and in overlapping relation to each other, to grip said core in a zig-zag configuration.

3. A device as defined in claim 2, wherein one of said flap portions is attached at its edge to said main portion and the other of said flap portions is attached at its edge to said one flap portion at a point on said one portion removed from the point of attachment thereof to said main portion, said other flap portion being bent into said one flap portion and said one flap portion in turn being bent down onto said main portion to cause said portions to overlap each other and grip said core in a zig-zag configuration.

4. A device as claimed in claim 2, comprising also a third flap portion in the form of a cap positioned laterally with respect to said main portion and the two flap portions, said third portion being bent down over the other two flap portions to enclose the same when they are bent down to grip said cable core.

5. A cable termination device, comprising a metallic body cap portion of substantially circular configuration, three approximately circularly-shaped portions extending laterally from said cap portion, one of said three circular portions having an aperture therein through which the bared metallic core of a cable passes, the other two of said three circular portions being bent down in overlapping relation to each other to thereby grip said core in a zig-zag configuration, said cap portion being adapted to be bent over said three circular portions.

JAMES WILLIAM SANGER-STEVENS.
HAROLD JOSEPH HUGHES WASSELL.

REFERENCES CITED

The following references are of record in the file of this patent:

UNITED STATES PATENTS

| Number | Name | Date |
|---|---|---|
| 1,309,887 | Fulton | July 15, 1919 |
| 1,608,578 | Buchenberg | Nov. 3, 1926 |
| 2,157,007 | Offner | May 2, 1939 |